US011221785B2

(12) United States Patent
Demoor et al.

(10) Patent No.: US 11,221,785 B2
(45) Date of Patent: Jan. 11, 2022

(54) MANAGING REPLICATION STATE FOR DELETED OBJECTS

(71) Applicant: Western Digital Technologies, Inc., San Jose, CA (US)

(72) Inventors: Thomas Demoor, De Haan (BE); Carl D'Halluin, Ghent (BE)

(73) Assignee: Western Digital Technologies, Inc., San Jose, CA (US)

( * ) Notice: Subject to any disclaimer, the term of this patent is extended or adjusted under 35 U.S.C. 154(b) by 34 days.

(21) Appl. No.: 16/701,947

(22) Filed: Dec. 3, 2019

(65) Prior Publication Data
US 2021/0165573 A1 Jun. 3, 2021

(51) Int. Cl.
*G06F 3/06* (2006.01)
*G06F 11/14* (2006.01)

(52) U.S. Cl.
CPC ............ *G06F 3/065* (2013.01); *G06F 3/067* (2013.01); *G06F 3/0622* (2013.01); *G06F 3/0652* (2013.01); *G06F 11/142* (2013.01)

(58) Field of Classification Search
CPC ...... G06F 3/0622; G06F 3/065; G06F 3/0652; G06F 3/0653; G06F 3/067; G06F 11/142
USPC ........................................................ 711/154
See application file for complete search history.

(56) References Cited

U.S. PATENT DOCUMENTS

| 8,621,161 | B1   | 12/2013 | Briggs |              |
|-----------|------|---------|--------|--------------|
| 10,049,016| B2 * | 8/2018  | Khurange | ........... G06F 12/0261 |
| 10,346,299| B1 * | 7/2019  | Danilov | .............. G06F 12/0261 |
| 10,936,548| B2 * | 3/2021  | Chen   | ..................... G06F 16/184 |
| 11,100,129| B1 * | 8/2021  | Popick | ................ G06F 16/2365 |
| 2002/0188711 | A1 * | 12/2002 | Meyer | .................. G06F 3/0632 709/223 |
| 2005/0278492 | A1 | 12/2005 | Stakutis et al. | |
| 2017/0032012 | A1 | 2/2017  | Zhang et al. | |
| 2018/0121531 | A1 | 5/2018  | Dong et al. | |
| 2018/0225052 | A1 | 8/2018  | Rogers et al. | |
| 2019/0391741 | A1 * | 12/2019 | Barinov | ................ G06F 9/4498 |

OTHER PUBLICATIONS

James O'Toole, Scott Nettles, and David Gifford. 1993. Concurrent compacting garbage collection of a persistent heap. In Proceedings of the fourteenth ACM symposium on Operating systems principles (SOSP '93). Association for Computing Machinery, New York, NY, USA, 161-174. (Year: 1993).*

(Continued)

*Primary Examiner* — Reginald G Bragdon
*Assistant Examiner* — Aaron D Ho
(74) *Attorney, Agent, or Firm* — Patent Law Works LLP

(57) ABSTRACT

Example distributed storage systems, replication state engines, and methods manage replication state for guaranteed replication between data stores. An object data store may store data objects that have been determined for deletion and rendered inaccessible to a client application. A replication state may be queried for deleted data objects and, if the replication state indicates that replication to another object data store is incomplete, physical deletion may be delayed until the replication state indicates that replication is complete and the data object may be physically deleted.

20 Claims, 8 Drawing Sheets

(56) References Cited

OTHER PUBLICATIONS

Scott Nettles and James O'Toole. 1993. Real-time replication garbage collection. In Proceedings of the ACM SIGPLAN 1993 conference on Programming language design and implementation (PLDI '93). Association for Computing Machinery, New York, NY, USA, 217-226. (Year: 1993).*

International Search Report and Written Opinion of Application No. PCT/US2020/025209, dated Aug. 28, 2020 (11 pages).

* cited by examiner

MANAGING REPLICATION STATE FOR DELETED OBJECTS

TECHNICAL FIELD

The present disclosure generally relates to data storage, and in a more particular example, to ensuring data transfer between data stores.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

A storage system node may store a set of data objects and/or object versions and those objects may be replicated to one or more other storage system nodes to provide redundancy for data recovery, response time, volume, load balancing, data retention policies, and other considerations. In some configurations, all objects from a node are copied to one or more other nodes and vice versa, in an attempt to synchronize the data objects present on each node. Replication may be unidirectional or multidirectional, and scalable systems may employ parallel replication to improve efficiency, reliability, and throughput of such systems. Service and network variations, system failures, and parallel replication may mean that replication order cannot be assumed or guaranteed based solely on the order of a replication queue or log from which the replication requests are being generated. Each data object may move between nodes independent of the other data objects.

In some configurations, replication between data stores may be mandated by redundant storage policy, data retention policy, backup and recovery configurations, or other storage system considerations. For example, a remote storage system may receive or generate data objects that must be reliably replicated to a backup, archival, or data warehouse data store. However, due to the remote location and possible resource or connectivity issues, immediate replication may be preferred but unreliable. As a result, replication may be delayed. If a delete request is received for new or modified data object before it can be replicated, the data object may be deleted and never replicated to the other storage system. This may result in violations of data retention policies and/or lost data in backup, archival, and warehousing data systems.

As large-scale storage systems scale and edge data stores are placed in remote locations with less reliable resources and connectivity, reliable and efficient implementations for guaranteeing replication of data objects may be needed. A need exists for at least managing replication state for deleted data objects for guaranteed data transfers between data stores.

SUMMARY

Various aspects for data object replication and management, particularly, the use of replication state for managing replication and physical deletion of data objects are described.

One general aspect includes a system that includes a delete function configured to render a data object stored in a first object data store inaccessible to a client application; a replication state machine configured to identify a replication state of the data object; and a garbage collector. The garbage collector is configured to: query the replication state of the data object, where the replication state indicates that a replication of the data object from the first object data store to a second object data store of a data storage system is incomplete; determine that the replication state of the data object has changed to indicate that the replication is complete; and responsive to the replication state indicating that the replication is complete, physically deleting the data object from the first object data store.

Implementations may include one or more of the following features. The replication state machine may be further configured to set, responsive to the first object data store storing the data object, the replication state of the data object to a null value. The replication state machine may be further configured to: monitor a replication manager for the replication manager to add the data object to a replication queue; and set, responsive to the replication manager adding the data object to the replication queue, the replication state to a replication pending value. The replication state machine may be further configured to: monitor a replication manager for the replication manager to complete replication of the data object; and set, responsive to the replication manager completing replication of the data object, the replication state to a successful replication value. The replication state machine may be further configured to: monitor a replication manager for the replication manager to identify a replication error for the data object; and set, responsive to the replication manager identifying a replication error for the data object, the replication state to a replication failed value. The replication state machine may be further configured to store, in an operations log, a replication state identifier for the replication state of the data object. The system may include a replication manager configured to: access the data object using a replication read command for data objects rendered inaccessible to the client application; and replicate the data object from the first object data store to the second object data store of the data storage system. The replication read command may be configured to detect a delete marker and a preceding write operation marker without a corresponding replication state identifier indicating successful replication. The garbage collector may be further configured to: initiate garbage collection for data objects rendered inaccessible to the client application and stored in the first object data store; and responsive to querying the replication state of the data object indicating replication is not complete, delay physical deletion of the data object from the first object data store.

Another general aspect includes a computer-implemented method that includes: determining to delete a data object stored in a data storage system; rendering the data object inaccessible to a client application; querying a replication state of the data object, where the replication state indicates that a replication of the data object from a first object data store to a second object data store of the data storage system is incomplete; determining that the replication state of the first data object has changed to indicate that the replication is complete; and responsive to the replication state indicating that the replication is complete, physically deleting the data object from the first object data store.

Implementations may include one or more of the following features. The computer-implemented method may include: storing the data object in the first object data store; and setting, responsive to storing the data object in the first object data store, the replication state of the data object to a null value. The computer-implemented method may include: monitoring a replication queue for an addition of the data object to the replication queue; and setting, responsive to adding the data object to the replication queue, the replication state to a replication pending value. The computer-implemented method may include: monitoring for complete replication of the data object; and setting, responsive to complete replication of the data object, the replication state to a successful replication value. The computer-implemented method may include: monitoring for a replication error for the data object; and setting, responsive to identification of the replication error for the data object, the replication state to a replication failed value. The computer-implemented method may include storing, in an operations log, a replication state identifier for the replication state of the data object. The computer-implemented method may include accessing the data object using a replication read command for data objects rendered inaccessible to the client application. The computer-implemented method may include: detecting, responsive to the replication read command accessing the data object, a delete marker and a preceding write operation without a corresponding replication state identifier indicating successful replication; and replicating, responsive to detecting the delete marker and the preceding write operation marker without a corresponding replication state identifier indicating successful replication, the data object to the second object data store. The computer-implemented method may include: initiating garbage collection for data objects rendered inaccessible to the client application and stored in the first object data store; and delaying, responsive to querying the replication state of the data object indicating replication is not complete, physical deletion of the data object from the first object data store. The computer-implemented method may include: completing, responsive to querying the replication state of the data object indicating replication is complete, garbage collection for data objects rendered inaccessible to the client application and stored in the first object data store.

Another general aspect includes a system that includes a first object data store configured to store a data object; means for determining to delete the data object stored in the first object data store; means for rendering the data object inaccessible to a client application; means for querying a replication state of the data object, where the replication state indicates that a replication of the data object from the first object data store to a second object data store is incomplete; means for determining that the replication state of the first data object has changed to indicate that the replication is complete; and means for, responsive to the replication state indicating that the replication is complete, physically deleting the data object from the first object data store.

The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the reliability of replication between data stores, such as by using replication states to ensure replication to a destination data store before physical deletion from the originating data store. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
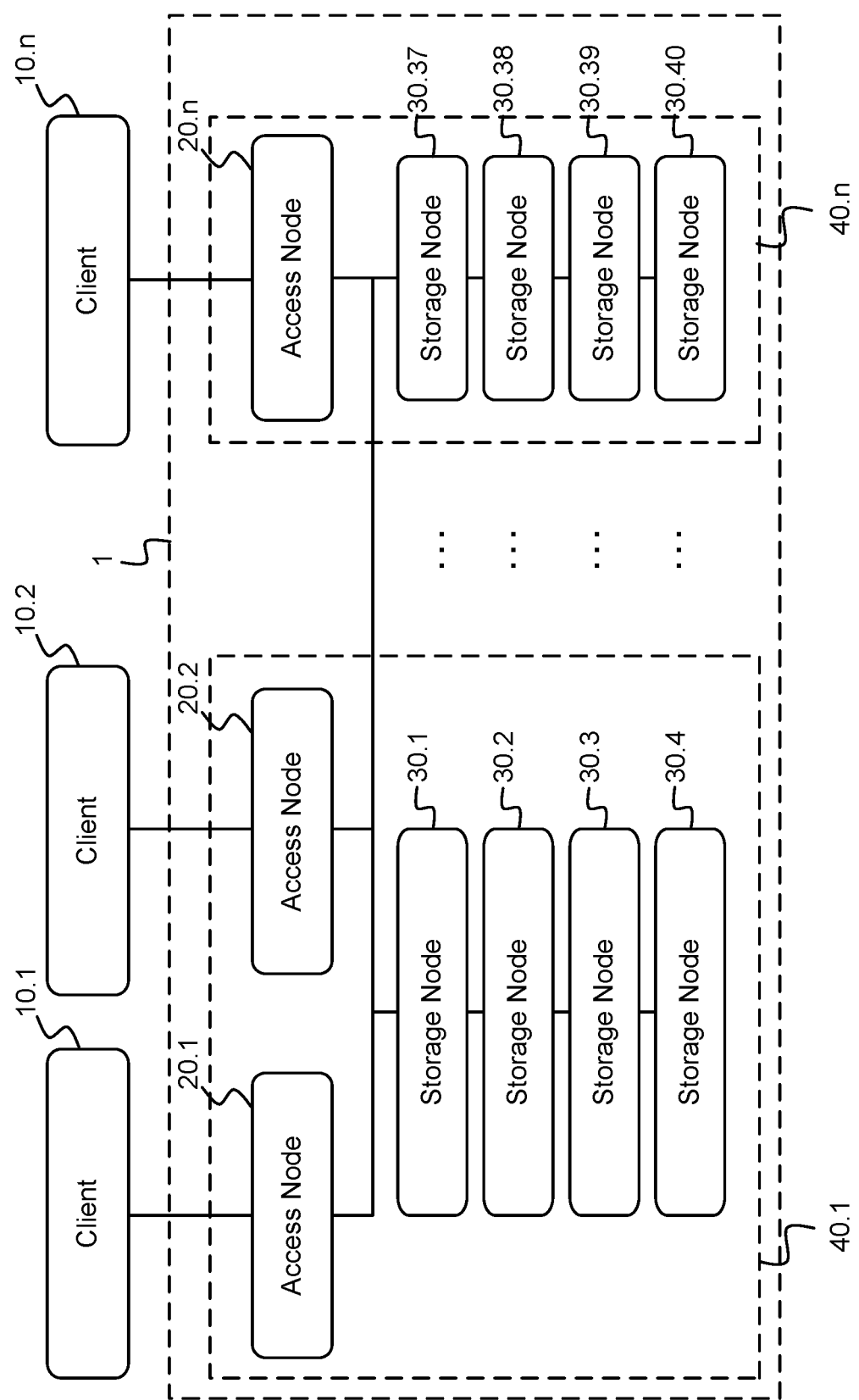
FIG. 1 schematically illustrates an example of a distributed storage system.

FIG. 1 shows an embodiment of an example distributed storage system 1. In some embodiments, the distributed storage system 1 may be implemented as a distributed object storage system which is coupled to one or more clients 10.1-10.$n$ for accessing data objects through one or more access nodes 20.1-10.$n$. The connection between the distributed storage system 1 and clients 10 could, for example, be implemented as a suitable data communication network. Clients 10 may host or interface with one or more applications that use data stored in distributed storage system 1. Such an application could, for example, be a dedicated software application running on a client computing device, such as a personal computer, a laptop, a wireless telephone, a personal digital assistant or any other type of communication device that is able to interface directly with the distributed storage system 1. However, according to alternative embodiments, the applications could, for example, comprise a suitable file system which enables a general purpose software application to interface with the distributed storage system 1, an application programming interface (API) library for the distributed storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

As further shown in FIG. 1, the distributed storage system 1 comprises a plurality of access nodes 20 and a plurality of storage nodes 30 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks.

Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers. Alternatively, they may be physically adapted for arrangement in large data centers, where they are arranged in modular racks 40.1-40.n comprising standard dimensions. Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30. In some embodiments, HTTP/REST protocols complying with the Amazon Simple Storage Service (S3) object storage service may enable data transfer through a REST application protocol interfaces (API). Such access nodes 20 may operate as a highly available cluster of controller nodes with one or more integrated and/or independent interface systems, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4 and 30.37-30.40 each are respectively grouped into racks 40.1 and 40.n. Access nodes 20 may be located in the same or different racks as the storage nodes to which the access nodes connect. A rack may have multiple access nodes, for example rack 40.1, a single access node as rack 40.n, or no access nodes (not shown) and rely on an access node in another rack or storage nodes or clients with built-in access node and/or controller node capabilities. These racks are not required to be located at the same location. They are often geographically dispersed across different data centers, such as for example rack 40.1 can be located at a data center in Europe and 40.n at a data center in the USA.

Figure 2:
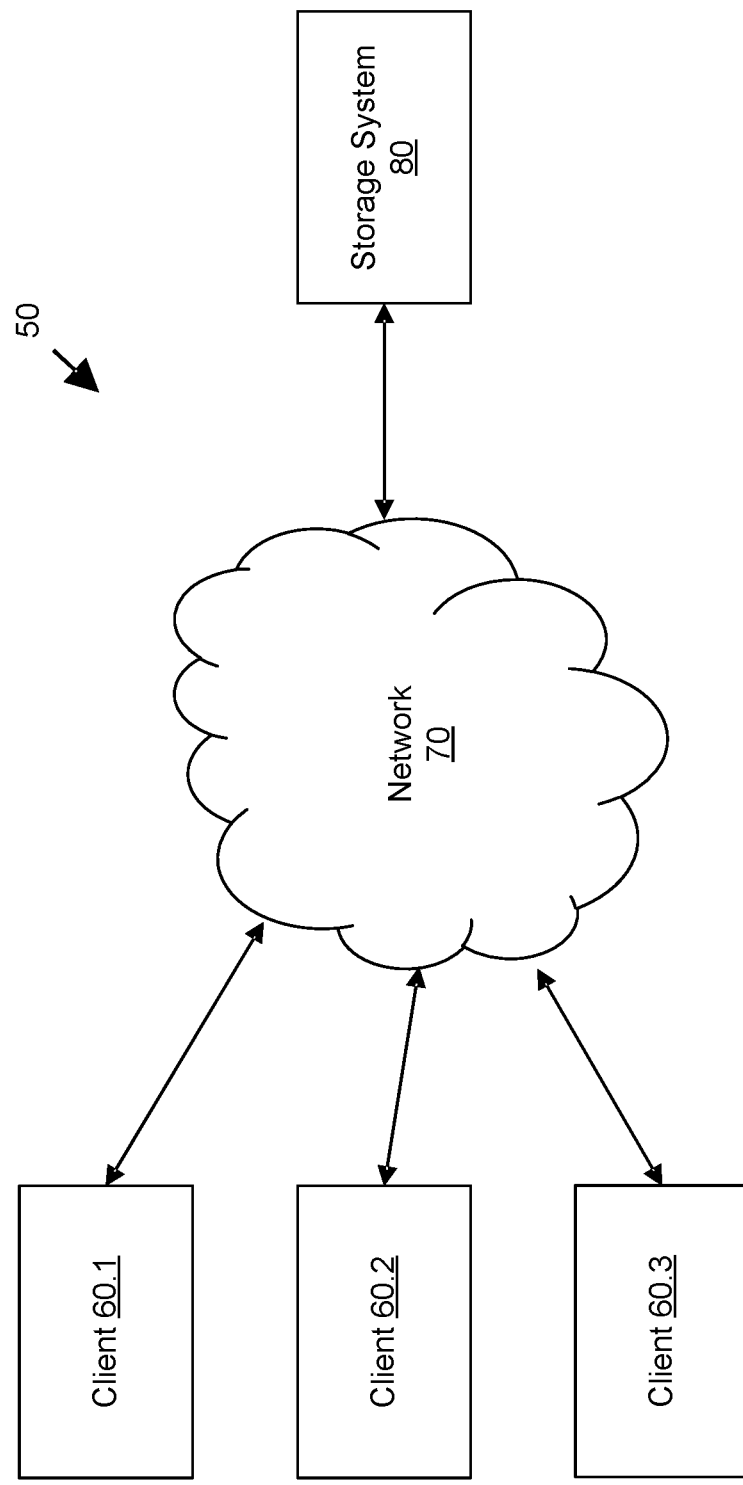
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
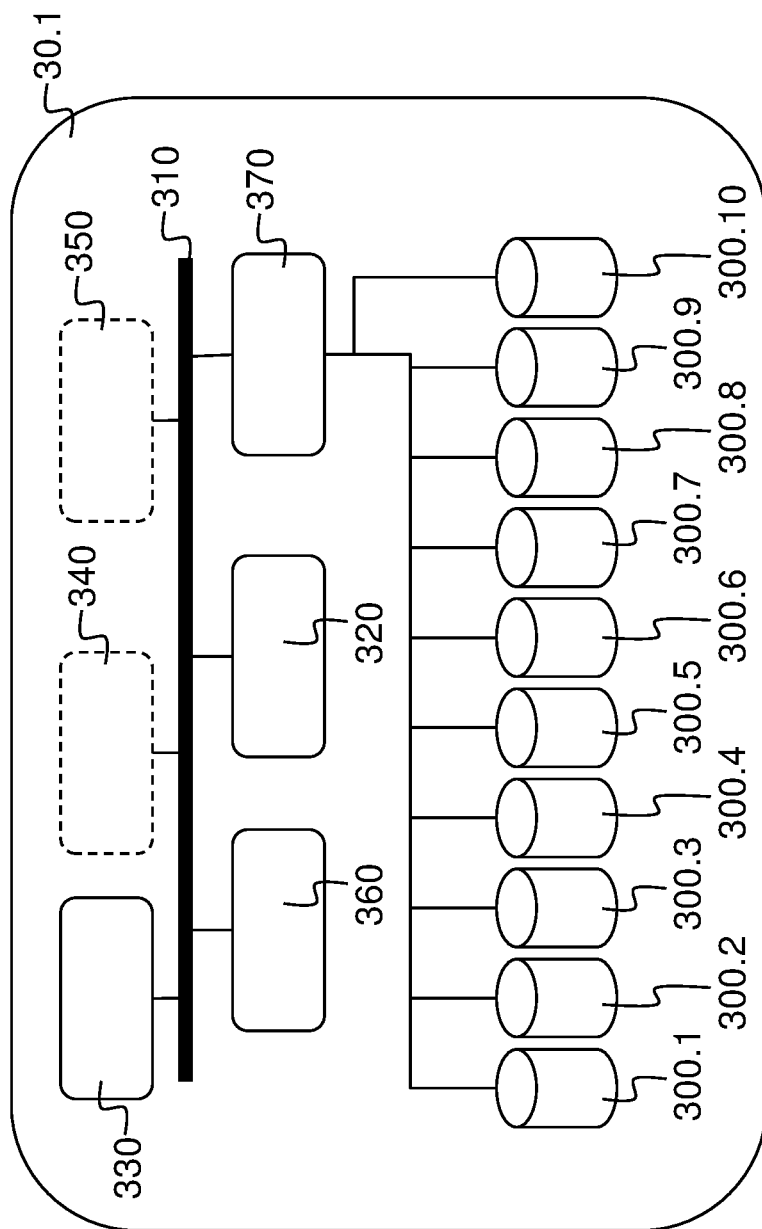
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 gigabit (Gb) Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 3 storage node 30.1 comprises ten storage elements 300.1-300.10. Other storage nodes 30 in FIG. 1 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g., 64 megabytes (MB) of binary data) and a data object identifier for addressing this data object, for example, a universally unique identifier such as a globally unique identifier (GUID). Embodiments of the distributed storage system 1 may operate as a distributed object storage system. Storing the data offered for storage by the application in the form of a data object, also referred to as object storage, may have specific advantages over other storage schemes such as block-based storage or file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disk spindle rotation to be synchronized. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
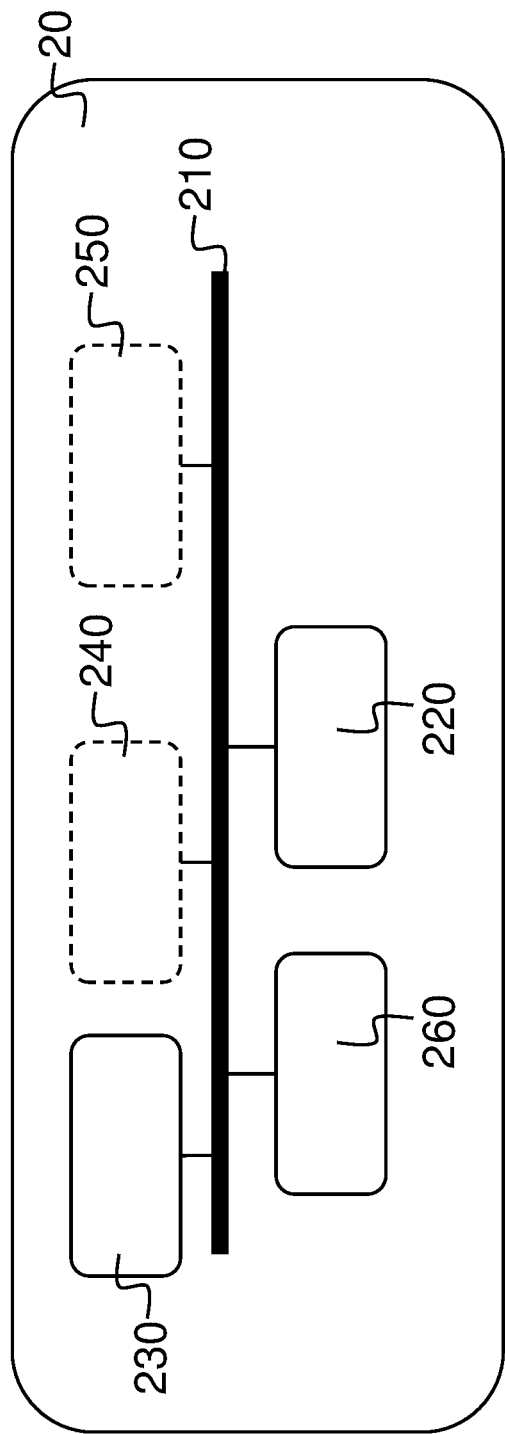
FIG. 4 schematically illustrates an example of a controller node or access node of the distributed storage system of FIG. 1.

FIG. 4 shows a schematic representation of an embodiment of the access node 20. Access node 20 may include controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250. In some embodiments, access node 20 may include object storage management functions, including object storage interface functions, version control management, and/or replication engines.

Bus 210 may include one or more conductors that permit communication among the components of access node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the access node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables access node 20 to communicate with other devices and/or systems, for example mechanisms for communicating with other storage nodes 30 or access nodes 20 such as for example two 10 Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
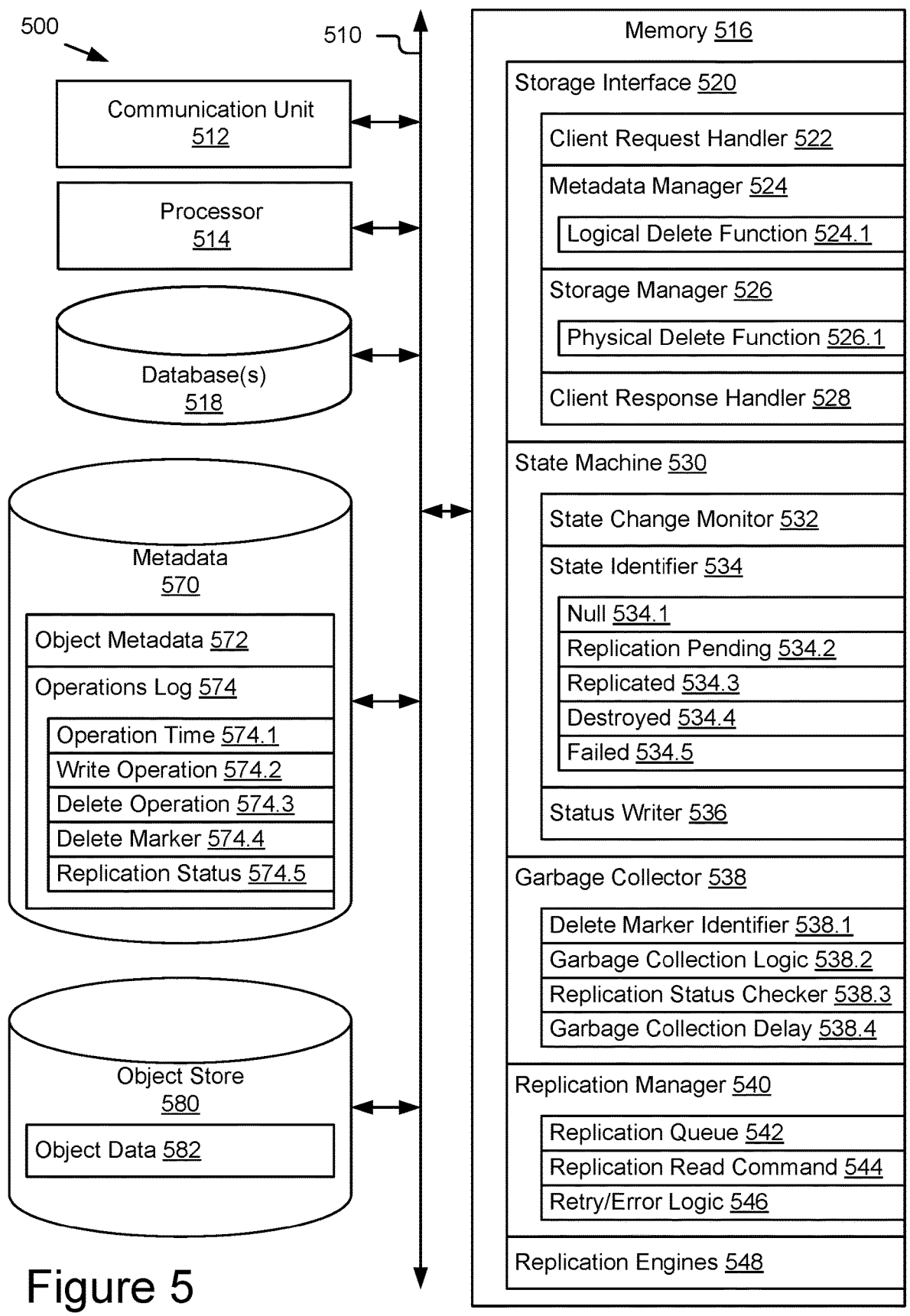
FIG. 5 schematically illustrates some example elements of an object storage system for the distributed storage system of FIG. 1.

FIG. 5 schematically shows selected modules of an access node or controller node with a state machine, garbage collection, replication management, and supporting functions. Object storage system 500 may be configured as a node with an architecture and/or hardware similar to controller nodes and/or storage nodes. Object storage system 500 may incorporate elements and configurations similar to those shown in FIGS. 1-4. For example, object storage system 500 may be configured in an access node 20 with object storage management functions.

Object storage system 500 may include a bus 510 interconnecting at least one communication unit 512, at least one processor 514, and at least one memory 516. Bus 510 may include one or more conductors that permit communication among the components of access system 500. Communication unit 512 may include any transceiver-like mechanism that enables access system 500 to communicate with other devices and/or systems. For example, communication unit 512 may include wired or wireless mechanisms for communicating with file system clients, other access systems, and/or one or more object storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Object storage system 500 may include or have access to one or more databases and/or specialized data stores, such metadata store 570 and object store 580. Databases may include one or more data structures for storing, retrieving, indexing, searching, filtering, etc. of structured and/or unstructured data elements. In some embodiments, metadata store 570 may be structured as reference data entries and/or data fields indexed by metadata key value entries related to data objects stores in object store 580. Object store 580 may include data objects comprised of object data (such as host data), some amount of metadata (stored as metadata tags), and a GUID. Metadata store 570, object store 580, and/or other databases or data structures may be maintained and managed in separate computing systems, such as storage nodes, with separate communication, processor, memory, and other computing resources and accessed by access system 500 through data access protocols. Metadata store 550 and object store 560 may be shared across multiple object storage systems 500.

In some embodiments, metadata store 570 and/or object store 580 may be sharded across multiple storage nodes. For example, object store 580 may include data objects and/or buckets of data objects that are managed across multiple storage nodes in redundant shards using replication functions to maintain substantial synchronization of available data objects. Object metadata and operations logs in metadata store 570 may be used to manage the redundant data shards and may themselves be sharded across multiple storage nodes.

Object storage system 500 may include a plurality of modules or subsystems that are stored and/or instantiated in memory 516 for execution by processor 514. For example, memory 516 may include a storage interface 520 configured to receive, process, and respond to object data requests from client systems or other nodes in distributed storage system 1. Memory 516 may include a state machine 530 configured to manage replication state information in metadata store 570 for data objects in object store 580. Memory 516 may include a garbage collector 538 configured to identify logically deleted data objects and physically delete them as a background process. Memory 516 may include a replication manager 540 for processing data replication between storage nodes or storage systems, such as transferring or replicating data objects to other object stores or across shards in the same object store. Memory 516 may include replication engines 548 for use by replication manager 540 in replicating data objects and related metadata among object storage systems and/or data shards. In some embodiments, state machine 530, garbage collector 538, and/or replication manager 540 may be integrated into storage interface 520 and/or managed as separate libraries or background processes (e.g., daemon) through an API or other interface.

Storage interface 520 may include an interface protocol or set of functions and parameters for storing, reading, and otherwise managing data requests to an associated distributed storage system and the corresponding metadata data source for mapping file data to persistent storage data elements. For example, storage interface 520 may include functions for reading, writing, modifying, or otherwise manipulating data objects and their respective client or host data and metadata in accordance with the protocols of an object storage system.

In some embodiments, storage interface 520 may include a plurality of hardware and/or software modules configured to use processor 514 and memory 516 to handle or manage defined operations of storage interface 520. For example, storage interface 520 may include a client request handler 522, a metadata manager 524, a storage manager 526, and a client response handler 528. For any given client request, storage interface 520 may receive a client request through client request handler 522 and determine one or more operations based on the content of the request. These operations may include metadata operations handled by metadata manager 524 and/or object data operations handled by storage manager 526. The results of these operations may be processed, formatted, and returned by client response handler 528.

Storage interface 520 may include one or more object storage configurations that define a storage protocol used for validating, managing, and processing object data requests. For example, object storage configurations may generally define the availability of version control for any given object or bucket, as well as specifying how the object storage system creates and manages versioning information. Object storage configurations may also define what metadata is collected and stored, as well as whether it is stored in a metadata database, such as metadata store 570, in object metadata tags stored in the data objects, and/or a combination thereof.

Client request handler 522 may include an interface and/or communication event-based condition for receiving object data requests from one or more clients. For example, client systems may send an object data request over a network connection and addressed to object storage system 500 or a port or component thereof. Client request handler 522 may receive these requests and parse them according to the appropriate communication and object storage protocols. For example, client request handler 522 may identify a transaction identifier, a client identifier, an object identifier (object name or GUID), a data operation, and additional parameters for the data operation, if any, from the received message or messages that make up the object data request.

In some embodiments, client request handler 522 may receive requests from one or more client applications. For example, the client applications may be hosted on other systems (e.g., host application servers) and may write, read, and otherwise manipulate data objects stored in object store 580. Client request handler 522 may receive delete requests that determine that an indicated data object should be rendered inaccessible to client applications and removed from object store 580. For example, a deleted data object may no longer be accessed, displayed, or acknowledged through client requests targeting the deleted data object or the logical bucket that once contained it. Requests targeting the deleted data object may return an error or no results to the client application. In some embodiments, object storage system 500 may use a two-stage process for deleting objects responsive to such a delete request. The delete request may be immediately processed to logically delete the data object by marking the data object as deleted in metadata 570, while a background garbage collector process will physically delete the data object when resources are available to do so.

Metadata manager 524 may include interfaces, functions, and/or parameters for creating, modifying, deleting, accessing, and/or otherwise managing object metadata, such as object metadata 572 stored in metadata store 570. For example, when a new object is written to object store 580, at least one new metadata entry may be created in metadata store 570 to represent parameters describing or related to the newly created object. Metadata manager 524 may generate and maintain an object data index for managing object metadata 572 and enabling metadata manager 524 to locate object metadata within metadata store 570. For example, metadata store 570 may be organized as a key-value store and the object data index may include key values for data objects.

In some embodiments, metadata store 570 may include one or more operation logs 574 for storing log operation entries for operations, such as write, read, delete, etc., targeting the data objects in object store 580. For example, operations related to data objects may be indexed with a key value that includes the object identifier or GUID for each object, an operation time value 574.1 (such as a timestamp or inverse timestamp) for when the operation occurred, and an operation type. A write operation 574.2 may include a write or object creation type that indicates a new object was created with the specified object identifier at the operation time value. A delete operation 574.3 may include a delete or kill type that indicates the specified data object is logically deleted and marked for garbage collection. Logical delete function 524.1 may generate the operations log entry for delete operation 574.3 and/or make other changes in metadata store 570 to render the deleted data object inaccessible to client data requests. In some embodiments, metadata manager 524 may also manage object metadata stored in object store 580 with object data 582. Metadata manager 524 may work in conjunction with storage manager 526 to create, modify, delete, access or otherwise manage object metadata stored as object tags within object store 580.

Storage manager 526 may include interfaces, functions, and/or parameters for reading, writing, and deleting object data elements in object store 580. For example, object PUT commands may be configured to write an object identifier, object data 582, and/or object tags to object store 580. Object GET commands may be configured to read data from object store 580. Object DELETE commands may be configured to delete data from object store 580, or at least mark a data object for logical deletion until a future garbage collection or similar operation physically deletes the data or reallocates the physical storage location to another purpose. In some embodiments, storage manager 526 may include physical delete function 526.1 configured to erase or otherwise reallocate the physical storage space previously occupied by the data object in object store 580. As described above, physical delete function 526.1 may not be initiated in direct response to a delete request received by client request handler 522, but invoked by garbage collector 538 as a separate operation during a garbage collection process to physically delete data objects that have previously been logically deleted through metadata manager 524.

Other object storage commands may be handled by storage manager 526. Object storage commands processed by storage manager 526 may include parameters for accessing special functions and/or metadata resources stored with host or client data in the data objects. Storage manager 526 may work in conjunction with metadata manager 524 and state machine 530 for managing data object states. Storage manager 526 may work in conjunction with replication manager 540 to replicate or migrate data from object store 560 to another data store or among shards. For example, storage manager 526 may read the object store 580 for transfer by one or more replication engines 548 managed by replication manager 540.

Client response handler 528 may include an interface and/or communication logic for sending response messages, such as result, status, or error messages, to one or more clients related to object data requests received. For example, client response handler 528 may wait for processing by metadata manager 524 and/or storage manager 526 to complete or generate an error, and then provide an appropriate result or error message to the client system(s) for each object data request received.

In some embodiments, metadata store 570 may be distributed across multiple systems, such as a plurality of access systems. Metadata store 570 and/or portions thereof may be sharded data stores, wherein the data stores are partitioned into segments stored in different computing systems. Storage interface 520 may include the functions for locating and accessing relevant portions of the sharded database.

State machine 530 may be invoked by storage interface 520 to manage state information for data objects in object store 560 and make that information available to other functions. For example, state machine 530 may be a replication state machine that maintains replication state identifier values for each data object and provides the replication state identifier value to garbage collector 538 by storing the value in operations log 574. State machine 530 may provide interfaces, functions, and parameters for assigning a process state to each data object and monitoring for changes of that state in real-time in order to update the state information as it changes. Other functions, processes, or components may use the consistently updated state information for their own processes and decision-making logic without having to separately monitor the operation for state changes.

In some embodiments, state machine 530 may be included within storage interface 520, such as within library functions used by client request handler 522, metadata manager 524, storage manager 526, and/or client response handler 528 for managing process states. In some embodiments, state machine 530 may be configured as a separate service or background operation (e.g., daemon) for managing process states for each data object and one or more operations, such as replication operations. In some embodiments, state machine 530 may include one or more hardware and/or software modules or data structures for executing specific operations. For example, state machine 530 may include a state change monitor 532, a state identifier 534, and a status writer 536.

State change monitor 532 may include functions, methods, or operations for initiating and monitoring the states of data object stored in object store 580. For example, state change monitor 532 may recognize the storage of a data object in object store 580 and monitor that data object with regard to one or more operations in order to identify when the data object's state changes. State change monitor 532 may support the one or more operational states supported by state machine 530. For example, state change monitor 532 may manage a monitoring thread or responsive logic for each operation, such as data object replication through replication manager 540. In some embodiments, state change monitor 532 may identify when a data object is written to object store 580 to initiate monitoring of that data object. State change monitor 532 may then monitor for a series of state change events in a target operation. For example, state change monitor 532 may include logic for monitoring when a data object is added to replication queue 542, successfully replicated by replication engines 548, and/or added to a retry queue or generating an error message in replication manager 540. In some embodiments, state change monitor 532 may monitor for the deletion or removal of data objects to provide a terminal state for data objects. For example, state change monitor 532 may include logic to identify when a data object is deleted by garbage collector 538.

State identifier 534 may include one or more parameters, data structures, and/or related methods for manipulating those parameters or data structures. State identifier 534 may map one or more state change events determined by state change monitor 532 to state identifier values for each data object. For example, state identifier 534 may include logic and table data structure for receiving a state change event and data object identifier from state change monitor 532, identifying the corresponding state identifier value, and forwarding the state identifier value and data object identifier to status writer 536. State identifier 534 may manage state identifier values for an operation, such as data object replication. The state identifier values may include any variable type as appropriate to storing and communicating the current state of the data object. For example, strings, flags, or numeric codes may be used to represent the plurality of state identifier values.

In an example embodiment for a replication state machine, state identifier 534 may manage up to five states for each data object. A null state value 534.1 may be assigned to a new data object, responsive to storage interface 520 receiving and/or storing the data object, prior to the data object entering or being assigned to a specific replication process. A replication pending state value 534.2 may be assigned to a data object once it is identified for replication by replication manager 540. For example, replication pending state value 534.2 may be assigned responsive to replication manager 540 adding the data object to replication queue 542. A replicated state value 534.4 may be assigned responsive to replication engines 548 successfully replicating the data object to a target data store, such as another data store shard or object storage system. For example, replication manager 540 may receive a replication complete message from the destination data store to confirm that the data object has been successfully replicated. A destroyed state value 534.4 may be assigned responsive to the end of life of the data object in object store 580. For example, destroyed state value 534.4 may be responsive to garbage collector 538 physically deleting the object after the object has been logically deleted and replicated and a destroyed data object may no longer be available for replication. A failed state value 534.5 may be assigned responsive to an error message representing a failure by replication manager 540 to replicate the data object. For example, replication manager 540 may attempt replication and fail to receive confirmation of successful replication and failed status value 534.5 may enable other system components to notify system administrators and/or other replication failure mechanisms. In some embodiments, failed state value 534.5 may represent only a final or permanent failure to replicate the data object and another state value, such as a retrying state value, may be provided for error conditions that allow retry and may only represent a delay in replication.

Status writer 536 may include functions, methods, or operations for storing, publishing, or otherwise communicating the state identifier values for each data object. For example, status writer 536 may write the state identifier value into metadata store 570 associated with the data object identifier to allow other components to determine the data object status based on the data object identifier as an index value. In some embodiments, state identifier values from state identifier 534 may be written to a replication status field 574.5 in operations log 574 for object creation entries. For example, operations log 574 may include operations log entries for each data object's creation or write operation 574.2 that identifies the data object by its object identifier and replication status field 574.5 may be appended to each entry and updated as replication status changes. In some embodiments, replication status 574.5 may be included in an alternate data structure indexed by object identifier or otherwise pointed to be the object identifier and/or corresponding operations log entries.

Garbage collector 538 may include functions, methods, or operations for physically deleting data objects from the storage media in object store 580. For example, a data object may first be marked for deletion in metadata 570 and garbage collector 538 may execute a background operation at a later time to reallocate storage space based on the deleted data objects that are no longer needed. In some embodiments, garbage collector 538 may operate in conjunction with storage manager 526 to initiate deletion of logical block addresses (LBAs) corresponding to one or more data objects to be deleted. Storage manager 526 and/or media managers in the storage devices themselves may manage the mapping of LBAs to actual physical positions in the storage media, as well as physical deletion of the data at those physical positions. Physical deletion may correspond to any process that renders the physical data unrecoverable by storage manager 526 using the addressing system supported by the storage nodes that comprise object store 580. Physical deletion may include the triggering of erase or overwrite functions that change the data on the media and/or reallocation of addressing such that the storage devices may no longer guarantee return of the data formerly stored in those physical positions or logical addresses generally corresponding to physical positions.

Garbage collector 538 may be configured to traverse operations log 574, identify operations log entries for a delete operation 574.3, and initiate physical delete function 526.1 in storage manager 526. For example, garbage collector 538 may be a background function supporting storage interface 520 that is triggered on a predetermined schedule, based on storage or operational thresholds, in response to available processor, memory, and other resources, or some combination thereof. Garbage collector 538 may be a log-based operation that uses operations log 574 to systematically identify delete operation 574.3 entries, generally in timestamp order. In some embodiments, a delete marker identifier 538.1 may traverse operations log 574 and use an operation type identifier to identify or determine delete operations and corresponding data objects to be deleted. Garbage collection logic 538.2 may determine how garbage collector 538 processes the identified data objects and their corresponding physical media and metadata representations. For example, garbage collection logic 538.2 may send a call for physical delete function 526.1 targeting the data object, as well as processing operations log 574 to remove operations log entries for the deleted data object that are no longer needed by object storage system 500. Once garbage collector 538 has processed a data object, the data object may be effectively unreadable and unrecoverable from object store 580.

Replication status checker 538.3 enables garbage collector 538 to check the replication state of a target data object. For example, replication status checker 538.3 may identify or determine the replication state identifier value stored in replication status field 574.5 for the target data object. In some embodiments, the replication state may be determined from a replication status field 574.5 associated with the delete operation. In some embodiments, replication status checker 538.3 may identify other operations log entries referencing the same data object, such as the write operation that created the data object, and access the replication status field associated with the write log entry. In some embodiments, replication status checker 538.3 may include logic for parsing the replication state identifier value for a data object and determining whether garbage collection should be allowed to process the data object or should be delayed to allow replication to complete. For example, if the replication state indicates that replication is complete, such as replicated status value 534.3, then garbage collection logic 538.2 may execute as normal to physically delete the data object.

If the replication state indicates that replication is not yet complete, such as any other replication state value, then replication status checker 538.3 may invoke garbage collection delay 538.4 to delay garbage collection on the identified data object. For example, the delete operation entry may be skipped and garbage collection may proceed to other data objects that have successfully replicated. The delayed delete operation may be revisited through a periodic garbage collection process that resets the start position in operations log 574 to traverse the time-based position of the delete operation entry and/or the delete operation may be placed in delay queue or register to enable another process for periodically revisiting the delete operation. During each iteration, replication status checker 538.3 may recheck the replication state identifier value for the data object to determine when state machine 530 changes the replication state. Responsive to any other replication state changing to replicated state value 534.3, garbage collection delay 538.4 may be lifted and garbage collection may be executed against the target data object. In some embodiments, completion of garbage collection may be communicated to state machine 530 and replication state may be changed to destroyed state value 534.4.

Replication manager 540 may include functions, methods, or operations for managing the transfer of data objects to other object stores or object storage systems. For example, replication manager 540 may manage one or more replication engines 548 that move data objects from object store 580 to a destination object store that may be remote from object store 580. In some embodiments, replication manager 540 may transfers each data object, including object data 582 and any associated object tags. In some embodiments, replication manager 540 may also transfer metadata associated with the data object from a corresponding metadata store, such as metadata store 570, including object metadata 572.

In some embodiments, replication manager 540 may be configured for asynchronous data transfers using a plurality of replication engines 548. For example, a scheduler may select objects for transfer based on criteria other than the order in which they were ordered within object store 560, such as object size, availability, etc. In some embodiments, replication engines 548 may operate in parallel and transfer data objects at similar times and using resources and paths that may result in different transfer rates. Thus, the data objects may be ingested at the destination system in a different order than they were stored in object store 580 or even a different order than they were sent. In some embodiments, replication manager 540 may manage a dedicated set of replication engines or a dynamically allocated subset of replication engines shared with one or more other replication managers. Replication manager 540 may also support multipart data object transfers that include a plurality of write transactions to complete a single object replication. For example, a multipart write process may include a series of commands or messages, such as INIT, multiple PARTPUT, and COMPLETE functions.

In some embodiments, replication manager 540 may include one or more hardware and/or software modules or data structures for executing specific operations. For example, replication manager 540 may include a replication queue 542, replication read command 544, and retry/error logic 546.

Replication queue 542 may include one or more parameters, data structures, and/or related methods for organizing data objects identified for replication. For example, data objects may be identified from a command, request, or background operation for replication to a destination data store or shard and added to a data structure embodying replication queue 542. In some embodiments, replication queue 542 may be generated by parsing operation logs 574 in order of operation time 574.1, such as in order of the timestamps associated with each operation log entry. In some embodiments, replication queue 542 may be ordered or reordered based on logic for enforcing service levels, load balancing across replication engines 548, or other efficiency or priority considerations. Replication queue 542 may support parallel replication by replication engines 548 and may include multiple queues and/or selection logic for determining which replication selects one or more data objects from replication queue 542.

Replication read command 544 may include functions, methods, or operations for accessing a data object that has received a delete request in order to read the data object for replication. For example, a data object may be marked as logically deleted in metadata store 570, such as by having a delete operation entry 574.3 including a delete marker 574.4. Under normal operating conditions, the logically deleted data object may be hidden and rendered inaccessible to other data operations, including the read commands used by replication engines 548. Replication manager 540 may enable a replication read command 544 that is configured to read logically deleted data objects. For example, replication read command 544 may include a modified GET-object-version call using a custom request header that allows a logically deleted data object, including a prior version of a data object, to be read. In some embodiments, replication read command 544 may read a data object that includes both a creation or write operation entry 574.3 (with a write operation marker such as a write value in an operation identifier) and later delete operation entry 574.3. Replication read command 544 may be enabled to bypass the logic for logically deleted objects and target the object reference in write operation entry 574.3 for replicating the data object. Replication read command 544 may include at least one security feature for guaranteeing that the command is being invoked by an authorized user in an authorized context. For example, replication read command 544 may force a validation of a special user status that is not available to client applications or regular user accounts.

Retry/error logic 546 may include a data structure of maintaining a list of failed replication requests that may be retried through an iterative retry process. For example, replication errors, such as failure of a replication engine and/or destination data store to confirm successful storage at the destination data store, may trigger an iterative retry process may be enabled for a fixed number of retries, retry period, or other limit on retry attempts. In some embodiments, replication queue 542 may include a retry queue, such as an operations table, with entries for each pending replication request and one or more parameters for determining priority, number of attempts, and other replication data relevant to managing retry attempts. In some embodiments, retry/error logic 546 may be monitored by state machine 530 to determine one or more state change events. If one or more dependency data objects remain in the retry/error queue for a predetermined period or number of attempts, retry/error logic 546 may generate a replication failure error for the logically deleted data object that may be communicated to state machine 530 and/or a client application, such as through client response handler 528, or to a system administrator or another system utility.

Memory 516 may include additional logic and other resources (not shown) for processing object data requests, such as modules for generating, queueing, and otherwise managing object data requests. Processing of an object data request by storage interface 520 may include any number of intermediate steps that yield at least one data request to the distributed storage system.

Figure 6A:
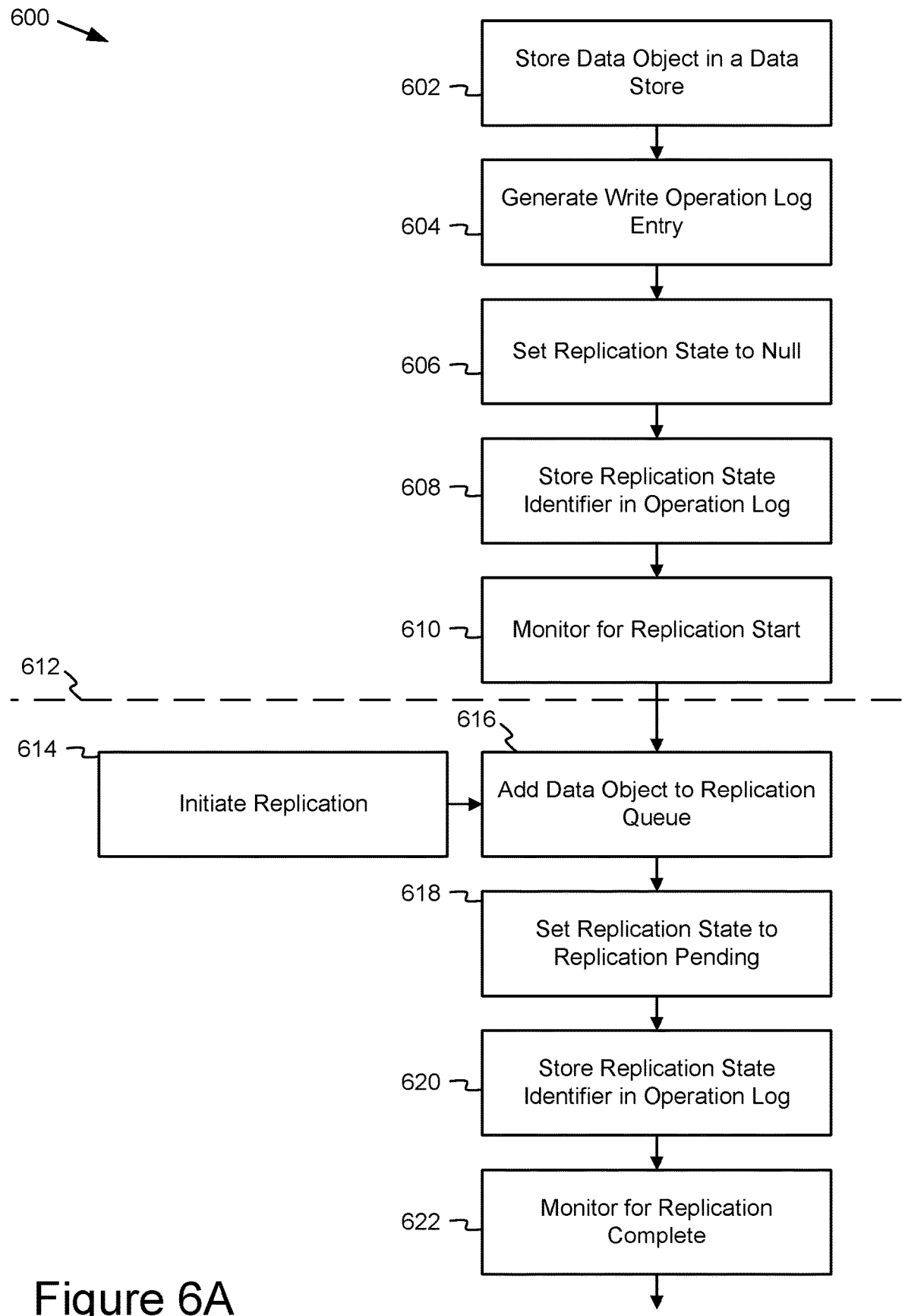
FIGS. 6A and 6B illustrate an example method for using replication states to manage replication of a deleted object.
Figure 6B:
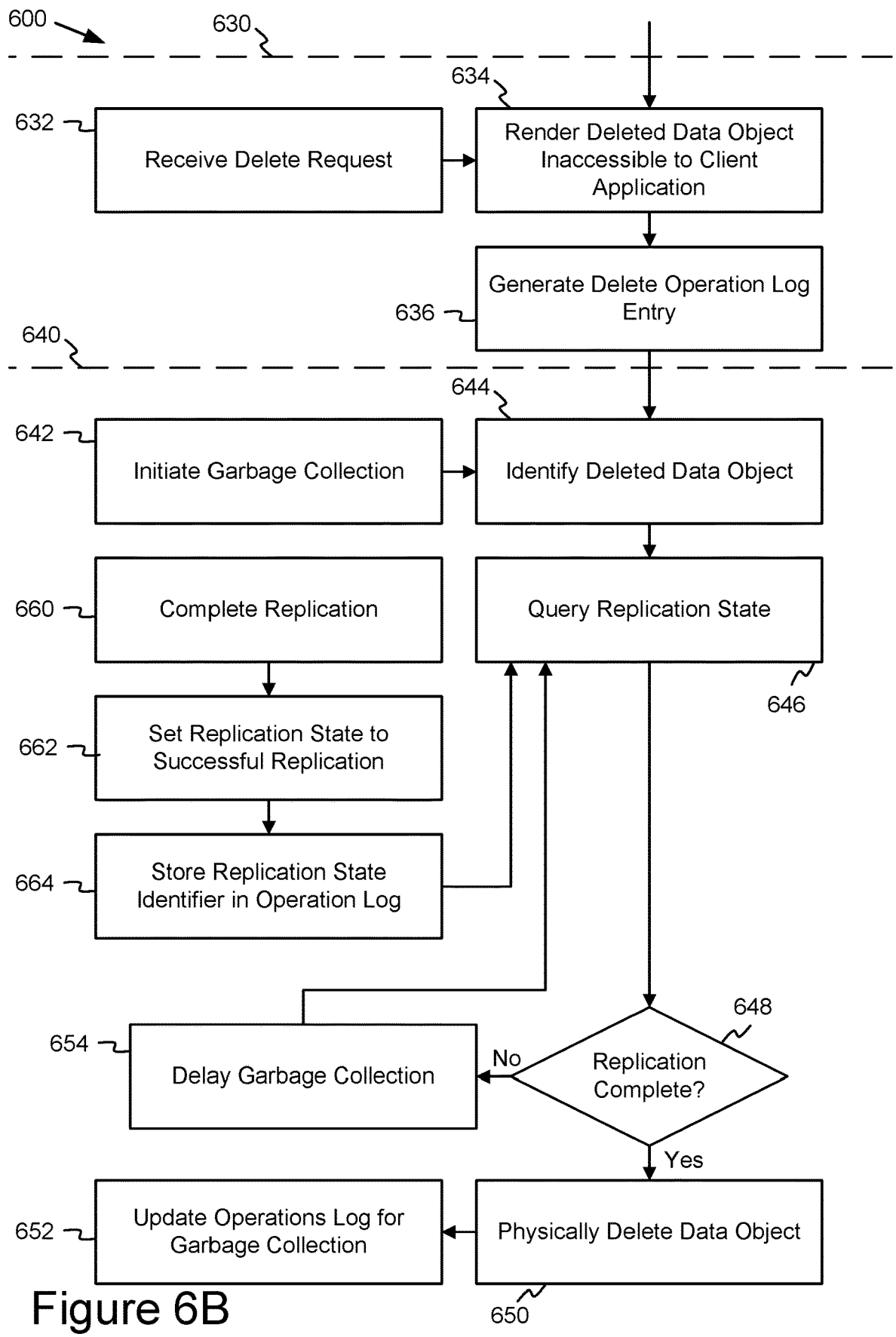

As shown in FIG. 6A-6B, the object storage system 500 may be operated according to an example method for using replication states to manage replication of a deleted object, i.e. according to the method 600 illustrated by the blocks 602-664 of FIG. 6.

At block 602, data objects may be stored in a data store. For example, a storage interface for the object storage system may write data objects to a data store in a distributed storage system based on one or more client applications supported by the object storage system.

At block 604, a write operation log entry may be generated and stored in the metadata store associated with the object store. For example, the storage interface may write a write operation log entry including a timestamp, object identifier, operation type, and content for the corresponding data object.

At block 606, a replication state may be set to a null value or a similar initial value. For example, in response to the writing the data object into the data store, a replication state engine may set a replication state identifier for the data object to "null".

At block 608, a replication state identifier set to the initial value may be stored in the operations log. For example, the replication state engine may store the "null" value in the write operation log entry for the data object or another metadata location pointed to from the operations log entry.

At block 610, the data object may be monitored for start of a replication operation. For example, the replication state engine may monitor a replication manager for a replication operation that targets the data object. At 612, an iterative or event-based monitoring process initiated at block 610 may wait for an appropriate replication status change event.

At block 614, a replication operation targeting the data object may be initiated. For example, the replication manager may process the operations log to identify a next data object to be added to a replication queue and reach the write operation log entry for the data object.

At block 616, the data object may be added to a replication queue to await replication to another data store. For example, the replication manager may add the data object to a replication queue that may be supported by a plurality of replication engines that select objects for replication from the replication queue according to a prioritization logic.

At block 618, the replication state may be set to replication pending or a similar replication-in-process value. For example, in response to the replication manager adding the data object to the replication queue, the replication state engine may set the replication state identifier for the data object to "pending".

At block 620, the replication state identifier set to the replication pending value may be stored in the operations log. For example, the replication state engine may store the "pending" value in the write operation log entry for the data object, overwriting the prior status, such as "null".

At block 622, the data object may be monitored for the replication operation to complete. For example, the replication state engine may monitor the replication manager for a replication complete message for the data object. At 630, an iterative or event-based monitoring process initiated at block 622 may wait for an appropriate replication status change event. In the example shown, a delete request may be received at block 632 prior to complete replication at block 660.

At block 632, a delete request for the data object may be received. For example, the client application may send and the storage interface may receive a subsequent delete request targeting the data object or a new version request that would delete the prior version of the data object.

At block 634, the deleted data object may be rendered inaccessible to the client application and/or conventional operations within the object storage system. For example, the storage interface may, responsive to the delete request, logically delete the data object such that subsequent operations targeting the deleted data object return empty results and/or error messages and listing or iterating the objects in the data store may not show the logically deleted data objects to reside in the data store, even though they may still be physically present.

At block 636, a delete operation log entry may be generated and stored in the metadata store associated with the object store. For example, the storage interface may write a delete operation log entry including a timestamp, object identifier, operation type, and delete marker for the corresponding data object. At 640, a period may elapse where the data object is logically deleted but garbage collection operating as a background process has not reached the deleted data object until block 644.

At block 642, garbage collection may be initiated. For example, the storage interface may initiate garbage collection as a background process on a periodic and/or resource availability basis and the garbage collector may traverse the operations log to determine which data objects have delete markers and should be physically deleted.

At block 644, the deleted data object from the request received at block 632 may be identified. For example, the garbage collector may reach the delete marker in the operations log for the data object and initiate a delete process for the data object.

At block 646, the replication state of the logically deleted data object may be queried. For example, the garbage collector may query the replication state identifier value in the operations log for the data object to evaluate whether or not replication is complete at block 648. If yes, the replication state identifier indicates that replication is complete and method 600 may proceed to block 650. If no, the replication state identifier indicates that replication is not complete and method 600 may proceed to block 654.

At block 650, the data object may be physically deleted. For example, the garbage collector may issue a delete command through the storage interface to the storage node and/or storage device storing the data object in its storage media, whereby the physical storage location(s) containing the data object may be overwritten or otherwise reallocated to other storage uses.

At block 652, the operations log may be updated to reflect garbage collection and physical deletion of the data object. For example, the operation log entries related to the deleted data object may themselves be marked for deletion and deleted from the operations log.

At block 654, garbage collection for the deleted data object may be delayed. For example, the garbage collector may include logic for skipping or holding the deleted data object that has not completed replication and returning to it once completed by periodically returning to the data object and querying an updated replication state at block 646.

At block 660, replication may complete for the deleted data object. For example, the replication manager may receive a message or other indication from the destination data store that the data object has been successfully replicated and stored in that data store.

At block 662, the replication state may be set to replication complete or a similar value indicating that replication is successful. For example, in response to the replication manager receiving a message indicating successful replication, the replication state engine may set the replication state identifier for the data object to "replicated" or another successful replication value.

At block 664, the replication state identifier set to the replication complete value may be stored in the operations log. For example, the replication state engine may store the "replicated" value in the write operation log entry for the data object, overwriting the prior status, such as "pending". Blocks 660-664 may complete in parallel with other operations and method 600 may return to block 646 for the next iteration after delayed garbage collection at block 654.

Figure 7:
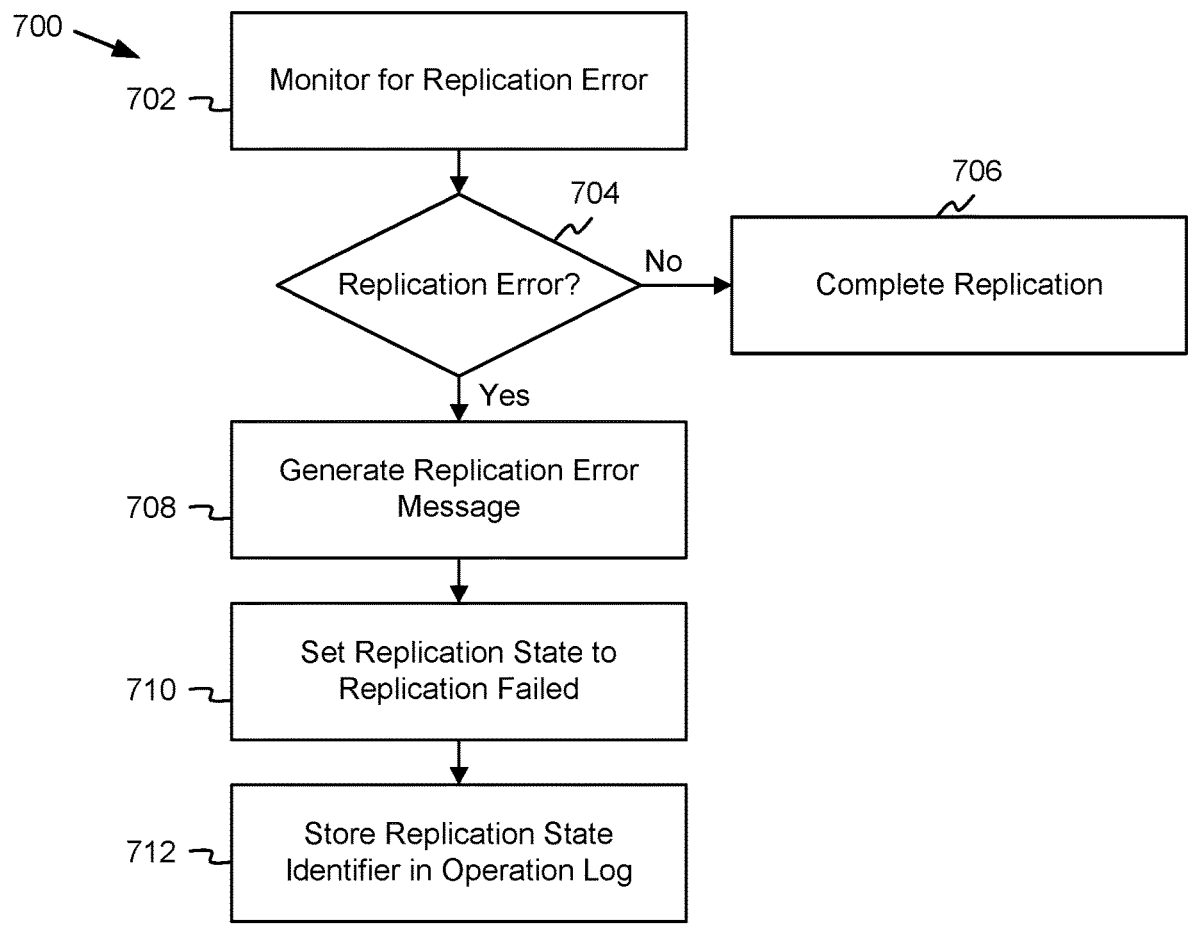
FIG. 7 illustrates an example method for handling replication errors.

As shown in FIG. 7, the object storage system 500 may be operated according to an example method for handling an error state, i.e. according to the method 700 illustrated by the blocks 702-712 of FIG. 7. In some embodiments, method 700 may operate in conjunction with one or more blocks of method 600 in FIG. 6.

At block 702, the data object may be monitored for the replication operation to generate an error. For example, the replication state engine may monitor the replication manager for a replication error message for the data object. In some embodiments of method 600, monitoring for replication to complete at block 622 may also include monitoring for an error condition to initiate method 700.

At block 704, whether a replication error condition has been identified or determined may be evaluated. If yes, an error condition, such as an error message from the replication manager or a timeout error, has been detected and method 700 may proceed to block 708. If no, no error condition has been detected and method 700 may proceed to block 706 for replication completing. In some embodiments, block 706 may correspond to block 660 of method 600 and operation may proceed in accordance with method 600.

At block 708, a replication error message may be generated. For example, the replication manager and/or storage interface may generate one or more messages indicating that replication was not completed and/or communicating the nature of the replication error to a client application, system administrator, and/or other system components.

At block 710, the replication state may be set to replication failed or a similar value indicating that replication has encountered an error condition. For example, in response to the replication manager receiving a message indicating a replication error from a replication engine or destination data store, the replication state engine may set the replication state identifier for the data object to "failed".

At block 712, the replication state identifier set to the replication failed value may be stored in the operations log. For example, the replication state engine may store the "failed" value in the write operation log entry for the data object, overwriting the prior status, such as "pending". In some embodiments, a failed status indicator may prevent garbage collection until a system administrator or some other intervention completed replication or acknowledges that replication is no longer necessary.

Figure 8:
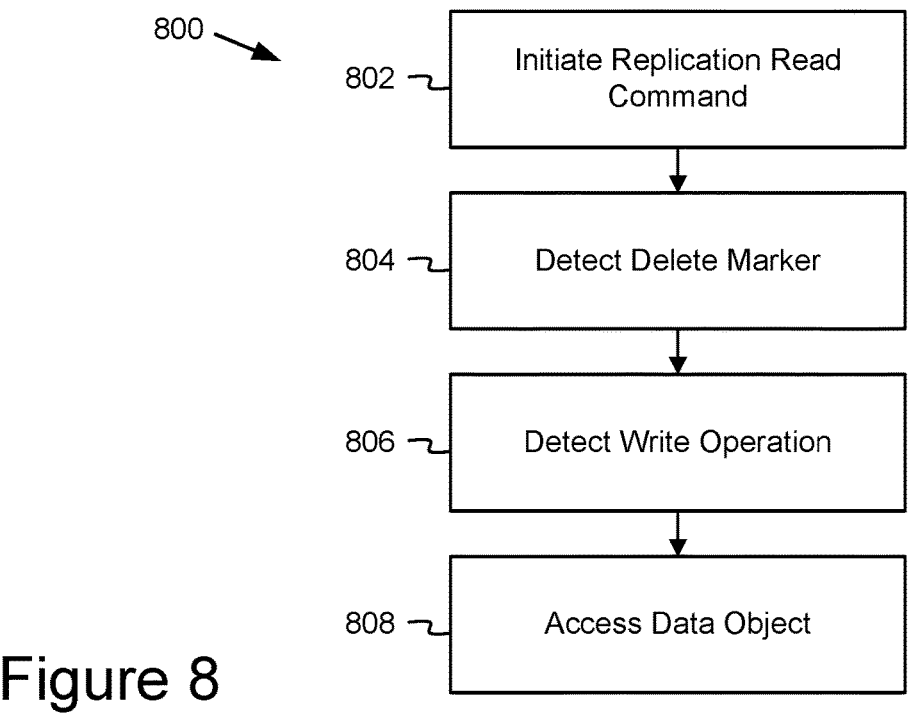
FIG. 8 illustrates an example method for using replication read commands to access deleted data objects.

As shown in FIG. 8, the object storage system 500 may be operated according to an example method for using replication read commands to access logically deleted data objects, i.e. according to the method 800 illustrated by the blocks 802-808 of FIG. 8. In some embodiments, method 800 may operate in conjunction with one or more blocks of method 600 in FIG. 6.

At block 802, the replication read command may be initiated for a target data object. For example, a logically deleted data object may be selected for replication by a replication manager and the replication engine assigned to replicate the data object may be configured to use the replication read command to bypass system logic for hiding and/or preventing access to logically deleted data objects. Initiating the replication read command may include one or more security checks to validate that an authorized system user for the replication process, rather than a client user, is initiating the command and it may not be initiated using an external client command.

At block 804, the delete marker for the data object may be detected. For example, the replication read command may detect a delete operation entry in the operations log for the data object.

At block 806, the write operation for the data object may be detected. For example, the replication read command may traverse the operations log to detect a preceding write operation entry in the operations log for the data object.

At block 808, the data object may be accessed to read and transfer the data object contents and metadata. For example, the replication read command may be processed by the storage interface to allow access to the logically deleted data object so that the replication engine can get the data object and put it to the destination data store.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
   at least one processor;
   at least one memory;
   an operations log, stored in the at least one memory, configured to store a plurality of log operation entries for storage operations targeting data objects in a first object data store;
   a delete function, stored in the at least one memory for execution by the at least one processor, configured to add a delete marker to the operations log to render a data object stored in the first object data store inaccessible to a client application;
   a replication state machine, stored in the at least one memory for execution by the at least one processor, configured to:
   identify a replication state of the data object; and
   store the replication state of the data object in the operations log; and
   a garbage collector, stored in the at least one memory for execution by the at least one processor, configured to:
   query, from the operations log, the replication state of the data object, wherein the replication state indicates that a replication of the data object from the first object data store to a second object data store of a data storage system is incomplete;
   determine that the replication state of the data object has changed to indicate that the replication is complete; and
   responsive to the replication state indicating that the replication is complete, physically delete the data object from the first object data store.

2. The system of claim 1, wherein the replication state machine is further configured to set, responsive to the first object data store storing the data object, the replication state of the data object to a null value.

3. The system of claim 1, wherein the replication state machine is further configured to:
monitor a replication manager for the replication manager to add the data object to a replication queue; and
set, responsive to the replication manager adding the data object to the replication queue, the replication state to a replication pending value.

4. The system of claim 1, wherein the replication state machine is further configured to:
monitor a replication manager for the replication manager to complete replication of the data object; and
set, responsive to the replication manager completing replication of the data object, the replication state to a successful replication value.

5. The system of claim 1, wherein the replication state machine is further configured to:
monitor a replication manager for the replication manager to identify a replication error for the data object; and
set, responsive to the replication manager identifying a replication error for the data object, the replication state to a replication failed value.

6. The system of claim 1, wherein the replication state machine is further configured to store, in the operations log, a replication state identifier for the replication state of the data object in an object creation entry for the data object.

7. The system of claim 1, further comprising:
a replication manager, stored in the at least one memory for execution by the at least one processor, configured to:
access the data object using a replication read command for data objects rendered inaccessible to the client application; and
replicate the data object from the first object data store to the second object data store of the data storage system.

8. The system of claim 7, wherein the replication read command is configured to detect a delete marker and a preceding write operation without a corresponding replication state identifier indicating successful replication.

9. The system of claim 1, wherein the garbage collector is further configured to:
initiate garbage collection for data objects rendered inaccessible to the client application and stored in the first object data store; and
delay, responsive to querying the replication state of the data object indicating replication is not complete, physical deletion of the data object from the first object data store.

10. A computer-implemented method, comprising:
determining to delete a data object stored in a data storage system, wherein the data storage system includes an operations log configured to store a plurality of log operation entries for storage operations targeting data objects in a first object data store;
rendering the data object inaccessible to a client application by adding a delete marker to the operations log;
querying, from the operations log, a replication state of the data object, wherein the replication state indicates that a replication of the data object from the first object data store to a second object data store of the data storage system is incomplete;
determining that the replication state of the data object has changed to indicate that the replication is complete; and
responsive to the replication state indicating that the replication is complete, physically deleting the data object from the first object data store.

11. The computer-implemented method of claim 10, further comprising:
storing the data object in the first object data store; and
setting, responsive to storing the data object in the first object data store, the replication state of the data object to a null value.

12. The computer-implemented method of claim 10, further comprising:
monitoring a replication queue for an addition of the data object to the replication queue; and
setting, responsive to adding the data object to the replication queue, the replication state to a replication pending value.

13. The computer-implemented method of claim 10, further comprising:
monitoring for complete replication of the data object; and
setting, responsive to complete replication of the data object, the replication state to a successful replication value.

14. The computer-implemented method of claim 10, further comprising:
monitoring for a replication error for the data object; and
setting, responsive to identification of the replication error for the data object, the replication state to a replication failed value.

15. The computer-implemented method of claim 10, further comprising:
storing, in the operations log, a replication state identifier for the replication state of the data object in an object creation entry for the data object.

16. The computer-implemented method of claim 10, further comprising:
accessing the data object using a replication read command for data objects rendered inaccessible to the client application.

17. The computer-implemented method of claim 16, further comprising:
detecting, responsive to the replication read command accessing the data object, a delete marker and a preceding write operation marker without a corresponding replication state identifier indicating successful replication; and
replicating, responsive to detecting the delete marker and the preceding write operation marker without a corresponding replication state identifier indicating successful replication, the data object to the second object data store.

18. The computer-implemented method of claim 10, further comprising:
initiating garbage collection for data objects rendered inaccessible to the client application and stored in the first object data store; and
delaying, responsive to querying the replication state of the data object indicating replication is not complete, physical deletion of the data object from the first object data store.

19. The computer-implemented method of claim 18, further comprising:
completing, responsive to querying the replication state of the data object indicating replication is complete, garbage collection for data objects rendered inaccessible to the client application and stored in the first object data store.

20. A system, comprising:
a first object data store configured to store a data object;

an operations log configured to store a plurality of log operation entries for storage operations targeting data objects in the first object data store;

means for determining to delete the data object stored in the first object data store;

means for rendering the data object inaccessible to a client application by adding a delete marker to the operations log;

means for querying, from the operations log, a replication state of the data object, wherein the replication state indicates that a replication of the data object from the first object data store to a second object data store is incomplete;

means for determining that the replication state of the data object has changed to indicate that the replication is complete; and means for, responsive to the replication state indicating that the replication is complete, physically deleting the data object from the first object data store.

* * * * *